United States Patent
Bachman

[11] 3,895,630
[45] July 22, 1975

[54] RESPIRATORY GAS ANALYZER INCLUDING A CARBON DIOXIDE AND RESPIRATORY QUOTIENT COMPUTER

[75] Inventor: John A. Bachman, Woodland Hills, Calif.

[73] Assignee: Del Mar Engineering Laboratories, Los Angeles, Calif.

[22] Filed: June 21, 1974

[21] Appl. No.: 481,517

Related U.S. Application Data
[63] Continuation-in-part of Ser. No. 366,696, June 4, 1973, abandoned.

[52] U.S. Cl. ............... 128/2.07; 73/23 R; 73/27 R; 73/421.5 R; 23/254 E; 23/255 E
[51] Int. Cl. ............................................ A61b 5/08
[58] Field of Search ................... 128/2.07, 2.08; 73/421.5 R, 23 R, 27 R, 195; 23/254 E, 255 E

[56] References Cited
UNITED STATES PATENTS

| | | | |
|---|---|---|---|
| 2,335,032 | 11/1943 | Sullivan | 73/27 R |
| 2,916,033 | 12/1959 | Coleman | 128/2.07 |
| 2,933,082 | 4/1960 | Billen | 128/2.07 |
| 3,305,318 | 2/1967 | Bennett | 73/421.5 R |
| 3,309,684 | 3/1967 | Kahn et al. | 128/2.07 |
| 3,338,087 | 8/1967 | Moberg et al. | 73/23 |
| 3,437,446 | 4/1969 | Pierce | 73/27 R |
| 3,511,237 | 5/1970 | Jaeger | 128/2.08 |
| 3,647,391 | 3/1972 | Keyes | 73/421.5 R |
| 3,726,271 | 4/1973 | Mondshine | 128/2.08 |
| 3,759,249 | 9/1973 | Fletcher | 128/2.07 |
| 3,799,149 | 3/1974 | Rummet et al. | 128/2.07 |

OTHER PUBLICATIONS

Hilberman et al., "Cardiac and Pulmonary Pathophy", J. A. For Advancement of Med. Inst., Vol. 6, No. 1, January, 1972, pp. 65–69.
Pearce, "$O_2$ Consumption and Control of $CO_2$," IEEB Trans. on Bio-Med. Eng'r., May 1971, pp. 235–237.

Primary Examiner—Richard A. Gaudet
Assistant Examiner—Lee S. Cohen
Attorney, Agent, or Firm—Jessup & Beecher; Keith D. Beecher

[57] ABSTRACT

A respiratory gas analyzer system and apparatus for medical purposes is provided. The system includes a thermal conductivity cell for measuring the amount of carbon dioxide in a sample of a subject's expired air. The system also includes a computer which periodically calculates and provides a digital display of the carbon dioxide production in the expired air. The latter computer also calculates and digitally displays the ratio of carbon dioxide production to oxygen depletion in the expired air, which is known as the "respiratory quotient".

13 Claims, 11 Drawing Figures

RESPIRATORY GAS ANALYZER INCLUDING A CARBON DIOXIDE AND RESPIRATORY QUOTIENT COMPUTER

This application is a continuation-in-part of pending application Ser. No. 366,696 filed June 4, 1973, now abandoned, in the name of John A. Bachman and entitled "RESPIRATORY GAS ANALYZER INCLUDING A CARBON DIOXIDE AND RESPIRATORY QUOTIENT COMPUTER".

OTHER RELATED COPENDING APPLICATIONS

Ser. No. 235,540, Clifford Sanctuary et al., filed Mar. 16, 1972, now U.S. Pat. No. 3,754,815.

Ser. No. 243,369, Clifford Sanctuary et al., filed Apr. 12, 1972, now U.S. Pat. No. 3,818,901.

BACKGROUND OF THE INVENTION

The analysis of a person's respiratory air has long provided physicians with an insight into the condition of his pulmonary system. Of interest to the physician in the analysis of the respiratory air is the measurement of the volume of expired air from the patient, the measurement of the oxygen depletion in the expired air, the measurement of the carbon dioxide production in the expired air, and the measurement of the respiratory quotient which is the ratio of carbon dioxide production to oxygen depletion.

Many instruments are presently available on the market for the determination of the total volume of expired air from the patient during a measured period of time. These devices include, for example, spirometers, plethysmographs, and pneumotachographs; the spirometers being the most commonly used for the purpose at the present time. Likewise, numerous instruments are available for determining the oxygen depletion (or oxygen "uptake" as it is usually referred to) and carbon dioxide production; such prior art devices operating on the basis of the chemical and physical characteristics of oxygen and carbon dioxide.

However, the prior art instruments mentioned in the preceding paragraph for the most part either perform with low accuracy or require especially skilled personnel for their operation. Moreover, the prior art devices, and especially those which provide in any way accurate results, are extremely high in cost and have excessive space requirements. Specifically, in the operation of the prior art devices, such as those referred to above, extensive and time-consuming manual calculations are necessary, which not only introduce costly delays into the process, but which also introduce possible human errors in the conversion for comparative purposes of the recorded data to standard conditions of temperature and pressure.

As the result of extensive engineering efforts, significant advances in the state of the art of respiratory gas analyzers have been made in recent years. One example of such a respiratory gas analyzer resulting from this effort is disclosed in copending application Ser. No. 243,369, now U.S. Pat. No. 3,818,901, filed in the name of Clifford Sanctuary et al., on Apr. 12, 1972, which is assigned to the present assignee. The respiratory gas analyzer described in the application provides for the periodic measurement and immediate display of the volume of the expired air of the patient, corrected, for example, to body temperature and ambient pressure; for the periodic measurement and immediate display of the oxygen depletion in the expired air, corrected to a standard temperature and pressure; and for the periodic measurement and immediate display of the oxygen depletion in the expired air per unit of the weight of the patient.

The respiratory gas analyzer of the Copending application Ser. No. 243,369, now U.S. Pat. No. 3,818,901 has proven to be extremely useful, even though it is somewhat limited in the pulmonary functions which may be measured and displayed thereby. The system of the present invention, on the other hand, provides the additional capability of measuring and displaying the carbon dioxide production and respiratory quotient in the patient's expired air, thereby furnishing the data required for a complete analysis of the patient's pulmonary functions.

The system and apparatus of the invention has an added advantage, in that it is relatively simple and inexpensive in its construction, and yet it operates with a high degree of accuracy. In addition, the system and apparatus of the invention is advantageous in that it requires no particular skills on the part of the operator. This is because the system and apparatus of the invention functions on an automatic basis to display digitally the aforementioned parameters of the patient's expired air.

In the respiratory gas analyzer of the copending application Ser. No. 243,369, now U.S. Pat. No. 3,818,901, a positive displacement volume meter and an associated sampling and correcting means are enclosed in an oven environment, and these components are used to measure the volume of air expired by the patient. The apparatus includes a volume computer so that the air volume, measured at standard body temperature and ambient pressure, and saturated with water vapor (BTPS), may be digitally displayed.

A gas analyzer is included in the system of the copending application Ser. No. 243,369, now U.S. Pat. No. 3,818,901, and it is used to determine the oxygen depletion of an accumulated sample taken during each minute from the total volume of the expired air. An oxygen uptake computer also is included in the system of the copending application, and this computer accepts the gas analyzer data and the volume data, and it calculates and displays the oxygen depletion in the expired air, corrected to a standard temperature and pressure, and dried (STPD).

A further computer, namely an oxygen uptake/unit weight computer is also included in the system of the copending application Ser. No. 243,369, now U.S. Pat. No. 3,818,901, and this computer utilizes the output from the oxygen uptake computer and an input of the patient's weight, so that it may calculate and instantly display the oxygen depletion per unit weight of the patient.

In the embodiments of the present invention to be described, a carbon dioxide cell is included in the system and it, likewise, is enclosed in the oven environment. The carbon dioxide cell is included in the system so that the accumulated sample of expired air also passes through it, and is processed therein to determine the percentage of carbon dioxide in the air sample. The system of the invention also includes a carbon dioxide and respiratory quotient digital computer, and this computer accepts electrical data from the carbon dioxide cell, and calculates and displays the carbon dioxide production and the "respiratory quotient" (ratio of carbon dioxide production to oxygen depletion) in the expired air. In this way, the system of the invention provides additional information concerning the pulmonary functions, which is necessary for a complete analysis of the patient's condition.

In the respiratory gas analyzer of the copending application Ser. No. 243,639, now U.S. Pat. No. 3,818,901, the air expired from a subject is passed through a precision bellow-type volume meter which is constructed to generate electric pulses, each of which is indicative of the passage of a known volume of air. A volume computer totals these pulses at the end of each minute, so that the air expired during the preceding minute may be determined. A sample of expired air proportional to the total volume of the expired air is extracted from the input of the volume meter during each minute for analysis by other components of the system.

To achieve such an analysis, the air sample is dried and mechanically passed to an oxygen measuring system, such as described, for example, in copending application Ser. No. 235,540, now U.S. Pat. No. 3,754,815. The oxygen measuring system described in that copending application uses a paramagnetic property of oxygen to measure the oxygen depletion in the gas sample, and it provides an electric output which is a measure of the partial pressure of oxygen in the gas sample. An oxygen uptake computer accepts the electrical output of the oxygen measuring system and calculates the oxygen depletion at standard temperature and pressure conditions, and the computer provides a digital display of the volume of oxygen depletion at the end of each minute.

The carbon dioxide measuring system to be described herein is included in the system in addition to the components described in the copending applications. One embodiment of the carbon dioxide measuring system uses the thermal conductivity of gases in a carbon dioxide cell to measure the carbon dioxide production in the gas sample. A second embodiment uses an infrared cell.

The carbon dioxide cell provides an analog voltage electrical signal output which is a measure of the percentage of carbon dioxide in the gas sample. A computer in the carbon dioxide measuring system accepts the analog output from the carbon dioxide cell, and it calculates the carbon dioxide production and the ratio of carbon dioxide production to oxygen depletion, i.e., the respiratory quotient in the expired air. The latter computer provides digital displays of these parameters for each successive sample, for example, at the end of each minute.

BRIEF DESCRIPTION OF THE DRAWINGS

FIG. 11 is a block diagram of a carbon dioxide cell and an associated automatic zeroing circuit, which, in accordance with a second embodiment of the invention, are incorporated into the system of FIG. 1.

DETAILED DESCRIPTION OF THE ILLUSTRATED EMBODIMENT

Figure 1:
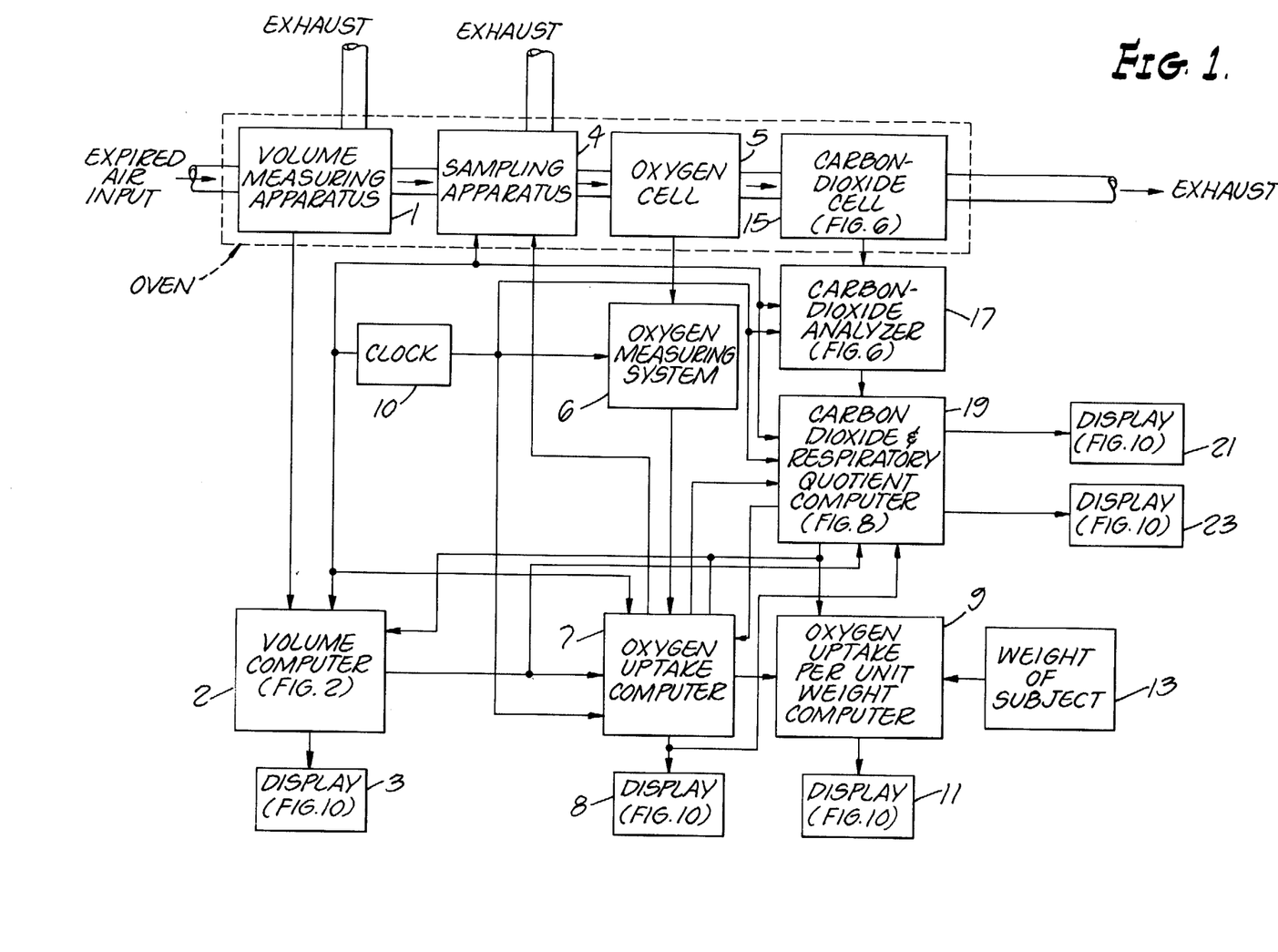
FIG. 1 is a block diagram of a respiratory gas analyzer constructed in accordance with the concepts of the present invention and including a carbon dioxide cell, and a carbon dioxide and respiratory quotient computer.
Figure 10:
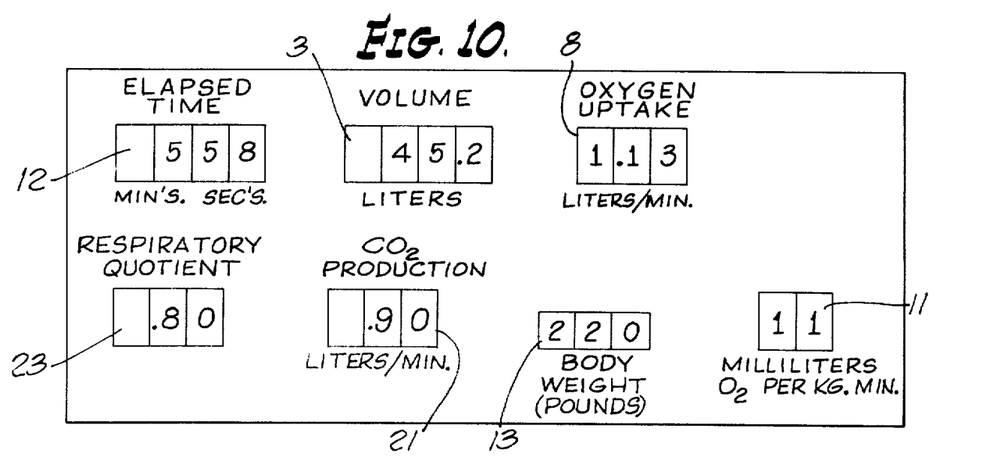
FIG. 10 is a schematic representation of a display panel in which the various displays of the system of FIG. 1 are mounted.

The block diagram of FIG. 1 represents various components of the respiratory gas analyzer described in the copending application Ser. No. 243,369, now U.S. Pat. No. 3,818,901, as well as the additional components which are incorporated into the system in accordance with the present invention. As shown in FIG. 1, the expired air from a patient is introduced into a volume measuring apparatus 1 which is fully described in the copending application Ser. No. 243,369, now U.S. Pat. No. 3,818,901. The volume measuring apparatus 1 responds to the subject's expired air to produce electrical pulses whose repetition frequency is a measure of the volume of the expired air, and to apply the electrical pulses to a volume computer 2. The volume computer utilizes the pulses from the volume measuring apparatus 1 to provide a measurement of the volume of the expired air of the patient, corrected to standard body temperature and to ambient pressure. The measurement is displayed digitally by a display 3, which is also shown in FIG. 10. The volume computer 2 is shown in full detail in FIG. 2, and will be more fully described subsequently herein.

A sampling apparatus 4, which is also described in the copending application Ser. No. 243,369, now U.S. Pat. No. 3,818,901 is coupled to the measuring apparatus 1, and the sampling apparatus periodically derives a sample of the expired air from the measuring apparatus. The sampling apparatus 4 then introduces the expired air sample to an oxygen cell 5, which may be of the type described in U.S. Pat. No. 2,416,334. The output from the oxygen cell 5 is applied to an oxygen measuring system 6 which may be similar to the measuring system described in copending application Ser. No. 235,540, now U.S. Pat. No. 3,754,815.

Figure 4:
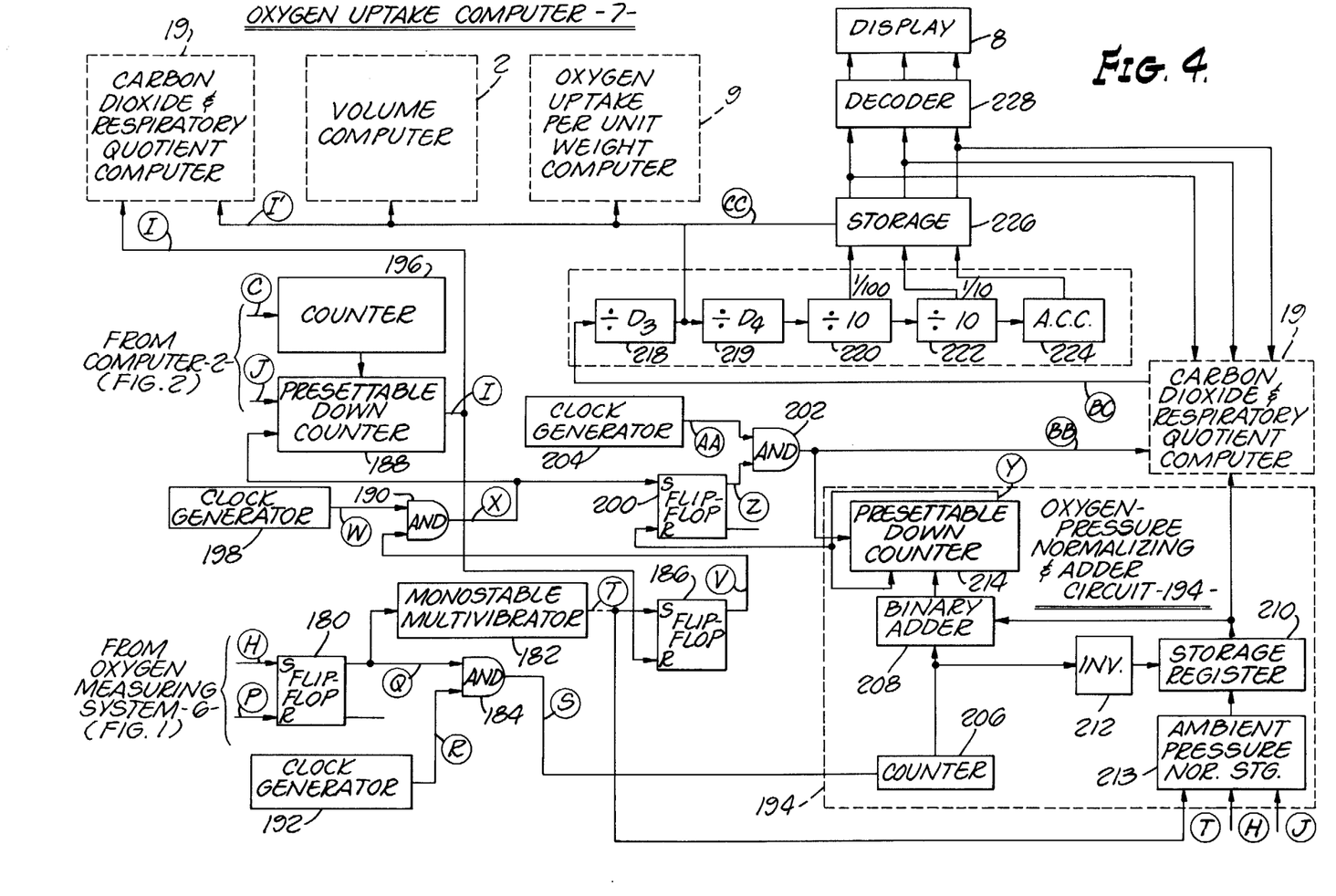
FIG. 4 is a logic block diagram of an oxygen uptake computer and associated display which also are incorporated into the system of FIG. 1.

An oxygen uptake computer 7, which is shown in detail in FIG. 4, is coupled to the oxygen measuring system 6, and it responds to electrical pulses from the measuring system to compute the oxygen depletion of the expired air sample corrected to standard body temperature and ambient pressure. The result is displayed digitally by a display 8 which is also shown in FIG. 10.

The system and apparatus of FIG. 1 also includes an oxygen uptake/unit weight computer 9 which responds to the electrical output data of the oxygen uptake computer; and to an electrical input representative of the weight of the patient, as set into a component 13, to display the oxygen depletion of the sample per unit weight of the subject on a digital display 11. The digital display 11 is also shown in FIG. 10. Clock signals for the various components of the system of FIG. 1 are generated by a clock signal generator 10 of usual construction.

After leaving the oxygen cell 5, the expired air sample flows into a carbon dioxide cell 15 in the apparatus and system of FIG. 1. The air sample is ultimately exhausted from the carbon dioxide cell 15 to the atmosphere. The carbon dioxide cell 15 generates an analog electrical output which is a measure of the percentage of carbon dioxide in the sample. This signal is accepted by a carbon dioxide analyzer 17. The carbon dioxide cell 15 and carbon dioxide analyzer 17 will be described in more detail in conjunction with FIG. 6.

Figure 8:
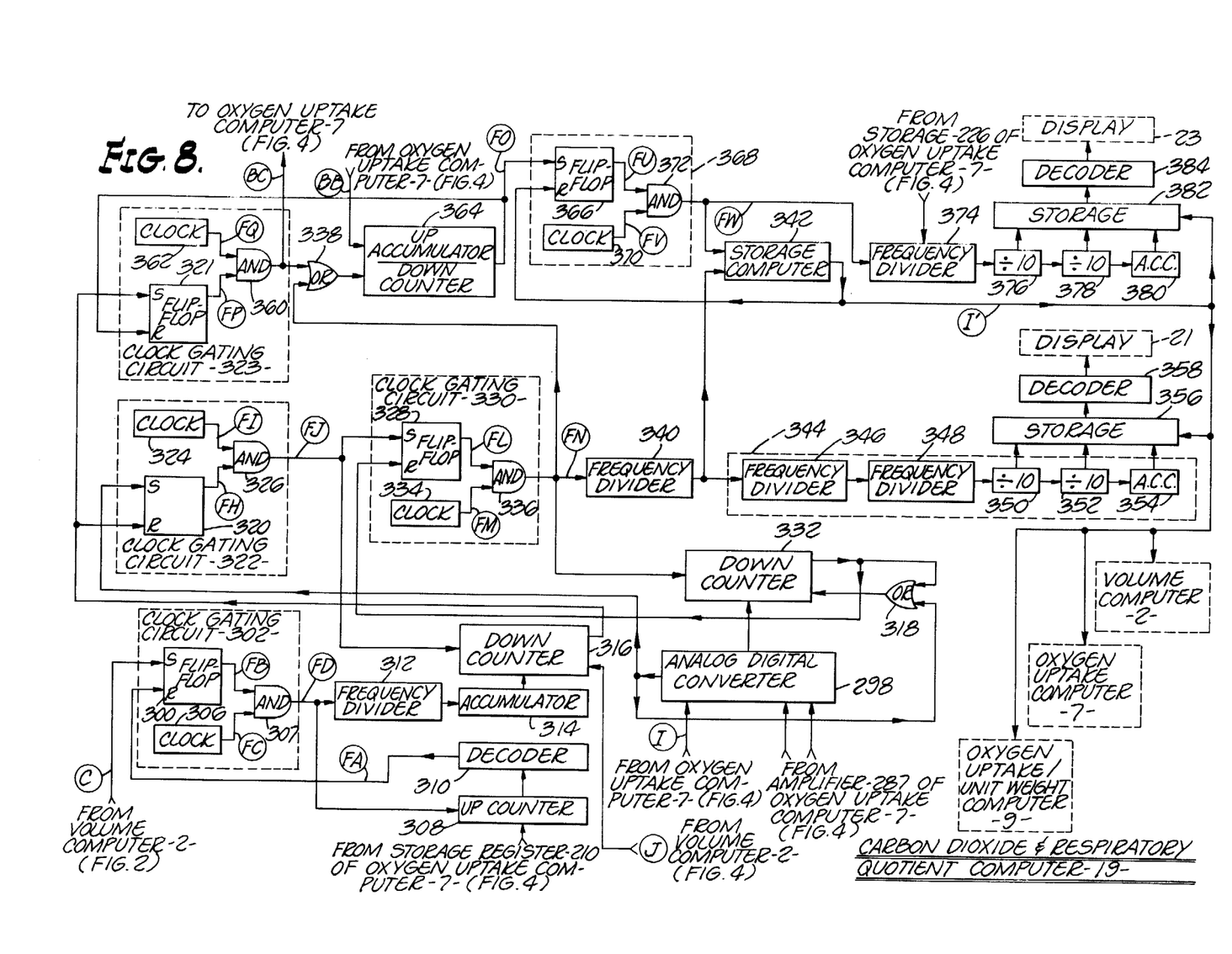
FIG. 8 is a logic block diagram of a carbon dioxide and respiratory quotient computer and associated displays which, in accordance with the present invention, are incorporated into the system of FIG. 1.

The system and apparatus of FIG. 1 also includes a carbon dioxide and respiratory quotient computer 19, which is shown in detail in FIG. 8, and which is coupled to the carbon dioxide analyzer 17. The computer 19 utilizes electrical data from the volume computer 2, from the oxygen uptake computer 7, and the analog electrical output from the carbon dioxide analyzer 17, to calculate the carbon dioxide production, and respiratory quotient in the patient's expired air. Specifically, the computer 19 effectively multiplies a digital signal representative of the amount of carbon dioxide in a sample of the patient's expired air with the digital output of the volume computer to derive the carbon dioxide production measurement. This measurement is divided in the computer 19 with the output of the oxygen uptake computer to derive the respiratory quotient measurement. The measurements of both these functions are displayed digitally by the displays 21 and 23, respectively, the latter displays also being shown in FIG. 10.

As indicated in FIG. 1, the volume measuring apparatus 1, the sampling apparatus 4, the oxygen cell 5, and the carbon dioxide cell 15, are all housed in an oven. This is in order to maintain known temperature conditions so as to facilitate compensation to established reference temperature standards and to prevent condensation of water vapor. The interior of the oven, and the units therein, can be maintained at a known temperature, such as 40° C, by any suitable thermostatically controlled means.

The expired air input to the apparatus of FIG. 1 is obtained from the patient by any appropriate known equipment. For example, a suitable nose clamp and mouthpiece are normally used to assure that all the air expired by the patient is introduced into the system, and none of the expired air is removed by inhalation of the patient. A sample of the expired air, accurately proportionate to the amount of expired air entering the volume measuring apparatus 1, is withdrawn by the system for analysis in order to determine the oxygen and carbon dioxide content therein.

As fully described in the copending application Ser. No. 243,369, now U.S. Pat. No. 3,818,901, the air expired from the patient is converted into electrical pulses by the volume measuring apparatus 1, the frequency of which is a measure of the volume of expired air passing through the apparatus. The electrical pulses from the volume measuring apparatus are applied to the volume computer 2, in which the pulses are totalled at the end of each minute, so that the amount of air expired during the preceding minute may be determined, and displayed.

Figure 2:
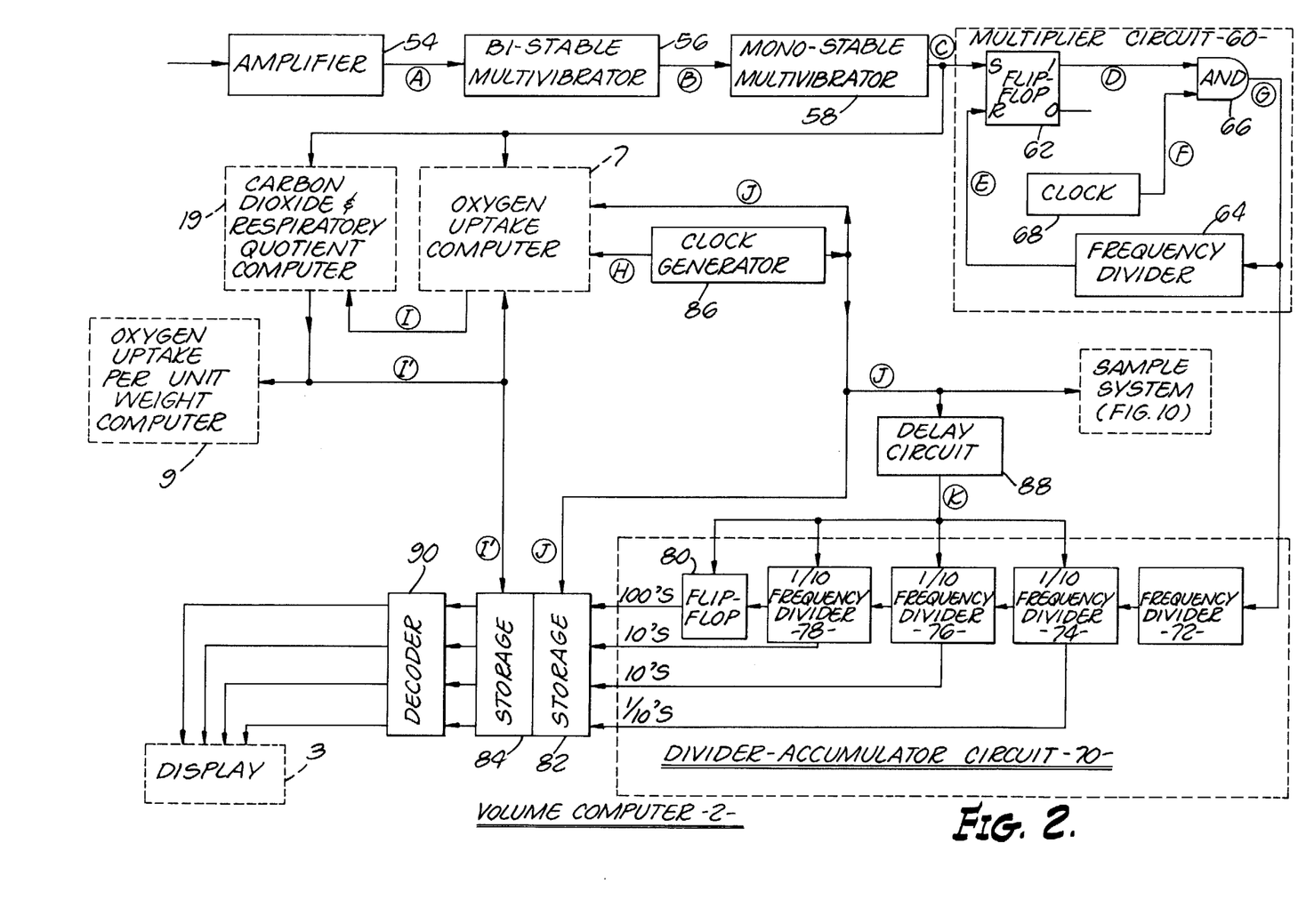
FIG. 2 is a logic block diagram of a volume computer and associated display which are incorporated into the system of FIG. 1.
Figure 3:
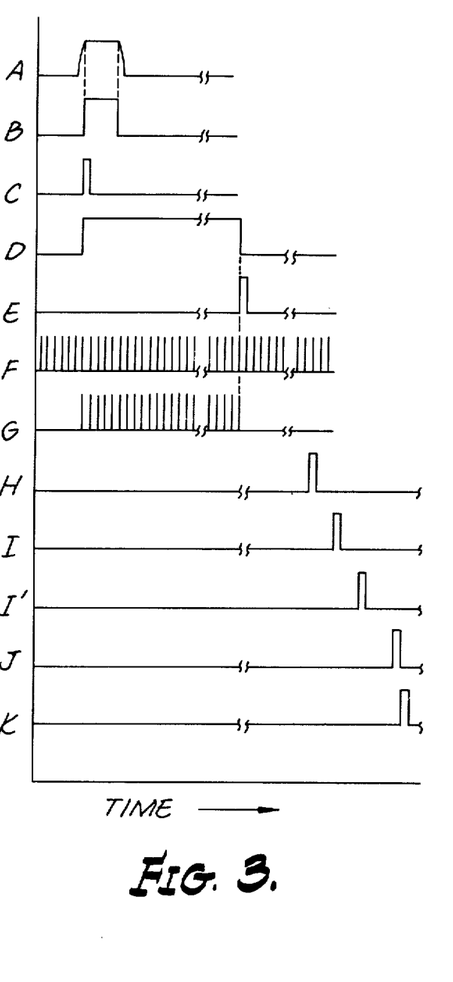
FIG. 3 is a series of waveforms which are present in various portions of the diagram of FIG. 2, and which are useful in explaining the operation of the volume computer of FIG. 2.

The volume computer is shown in more detail in the block diagram of FIG. 2. As shown in FIG. 2, the electrical pulse signal from the volume measuring apparatus 1 is applied to an amplifier 54. The amplified pulse signal from the amplifier 54, as shown by the curve A of FIG. 3, is applied to a bistable multivibrator 56. The multivibrator 56 is used for sharpening purposes, and it generates a pulse signal B in FIG. 3 with sharp leading and trailing edges. The multivibrator 56 applies its output to a monostable multivibrator 58 which, in turn, generates an output square wave signal, such as shown by the waveform C of FIG. 3, in response to each input pulse in the signal from the bistable multivibrator 56. The output from the monostable multivibrator 58 is fed to the oxygen uptake computer 7, to the carbon dioxide and respiratory quotient computer 19, and to a multiplier circuit 60.

The multiplier circuit 60 is made up of a flip-flop 62, a frequency divider 64, an "and" gate 66, and a clock signal generator 68. Each pulse from the monostable multivibrator 58 sets the flip-flop 62, and the flip-flop remains set until it is reset by an output pulse in the signal from the divider 64 (waveform E in FIG. 3). Therefore, a signal such as shown by the waveform D in FIG. 3, appears at the output of the flip-flop 62 in response to each pulse in the signal from the multivibrator 58. The output from the flip-flop 62 is applied to the and gate 66, as are a series of clock pulses (waveform F in FIG. 3) from the clock signal generator 68. As a result, the and gate 66 passes the clock pulses during each interval in which the flip-flop 62 is in its set state, as shown by the waveform G of FIG. 3.

The signal from the and gate is applied to the frequency divider 64 which develops its output pulse E after the receipt of a predetermined number of pulses from the and gate, so as to reset the flip-flop 62 at that time which, in turn, disables the and gate 66. The repetition frequency of the clock pulses from the clock signal generator 68 is selected to be above the highest possible frequency of pulses generated by the volume measuring apparatus 1, so that it will be assured that the flip-flop 62 will be reset within the time interval between successive pulses from the volume measuring apparatus.

The output from the multiplier circuit 60 is also applied to a divider-accumulator circuit 70 in order to complete the process of calculating the volume of expired air as compensated to a new reference temperature. The divider-accumulator comprises four frequency dividers 72, 74, 76 and 78, connected in cascade, and driving a flip-flop 80. The first frequency divider 72 is driven by the pulse signal from the multiplier circuit 60 (waveform G in FIG. 3), and it develops output pulses having a predetermined sub-multiple of the frequency of the input pulses.

The output pulses from the divider 72 drive the divider 74, and the latter divider generates an output pulse for each 10 input pulses received from the divider 72. The pulses from the divider 74 are then processed by the dividers 76 and 78 which, likewise, have individual divisors of ten. The output of the divider 78 drives the flip-flop 80. The divider 74, therefore, develops an output indicative of the volumetric measurement of the total expired air in tenths of a measure at the new reference temperature, the divider 76 develops an output which is indicative of a unit measure of volume at that temperature, the divider 78 develops an output which is indicative of a measure of volume in 10s, and the flip-flop 80 develops an output which is indicative of the volumetric measurement in hundreds.

The signals accumulated in the divider-accumulator circuit 70 are periodically released for storage in a first of two storage units 82 and 84 included in the volume computer 2. The storage units 82 and 84 may be usual flip-flop registers, as are commonly used for the temporary storage of digital data. The storage unit 82 collects and stores the latest data accumulated in the divider-accumulator circuit 70, and it periodically transfers its contents to the storage unit 84.

The transfer from the storage unit 82 to the storage unit 84 of data stored in the unit 82 from the preceding period, as well as the transfer of data from the divider-accumulator circuit 70 to the storage unit 82, is accomplished by the receipt by the storage unit 82 of a positive pulse of a timing signal (waveform J in FIG. 3) generated by a timing signal generator 86 at, for example, 60 second intervals. The timing signal J is also introduced to the oxygen uptake computer 7 of FIG. 4, and to the carbon dioxide and respiratory quotient computer 19 of FIG. 8. The timing signal J is also used to reset the dividers 72, 74, 76 and 78 and the flip-flop 80, after an appropriate delay in a delay circuit 88. The delay circuit 88 may comprise, for example, two monostable multivibrators, and it develops the signal shown in the waveform K of FIG. 3, which is delayed slightly with respect to the signal of waveform J.

The timing signal generator 86 also generates a timing signal H which precedes the timing signal J, and which is applied to the oxygen uptake computer 7 of FIG. 4. The oxygen uptake computer 7, in turn, applies a corresponding timing signal I to the carbon dioxide and respiratory quotient computer 19 of FIG. 8, and the latter computer develops a timing signal I' which is slightly delayed with respect to the timing signal H, but which still occurs in advance to the timing signal J by some finite time interval, as shown by the curves in FIG. 3. The timing signal I' is then fed to the storage unit 84 of the volume computer 2, and to the oxygen uptake per unit weight computer 9.

The timing signal H from the timing signal generator 86 is used by the oxygen uptake computer 7, as will be described, to initiate the computation within the computer, and the oxygen uptake computer generates the corresponding timing signal I at the completion of that computation. The timing signal I is used by the carbon dioxide and respiratory quotient computer 19, as will be described, to initiate the computation within that computer, and the computer generates the corresponding timing signal I' at the completion of its computation. Since the time required to accomplish the oxygen depletion computation and, likewise, the carbon dioxide production computation is dependent upon the volume of air expired during the corresponding period, the completion times of the calculations will vary. Therefore, the delay of the I' timing signal with respect to the H timing signal may vary for different periods, but in all cases will follow the H timing signal by some finite interval.

The data in the storage unit 82 is transferred to the stoage unit 84 upon the receipt of each pulse in the I' timing signal, and this data is released to a decoder 90 which converts, in usual manner, the binary coded digital output from the storage unit 84 into a form appropriate for energizing the display 3, which may be a usual Nixie tube display. The display 3, as shown in FIG. 10, displays the total volume of air for each successive period in hundreds, tens, units, and tenths of a measure expired by the subject during each one minute period; the volume being compensated to a new reference temperature, to ambient pressure, and saturated with water vapor.

As mentioned above, a proportionate sample of the total amount of air passing through the volume measuring apparatus 1, is derived by the sampling apparatus 4, and is passed to the oxygen cell 5. The electrical output of the oxygen cell 5 is applied to the oxygen uptake computer 7, which is shown in block form in FIG. 4.

In a manner described in detail in the copending application Ser. Nos. 243,639, now U.S. Pat. No. 3,818,901, and 235,540, now U.S. Pat. No. 3,754,815 the oxygen measuring system 6 associated with the oxygen cell 5 develops electrical output pulses P (FIG. 5) bearing a time relationship with the pulses of the timing signal H, such that the time interval between the two pulses is a measure of the oxygen partial pressure of the air sample passing through the oxygen cell 5, as compared with the oxygen partial pressure of a calibrated standard.

The H and P signals are applied to the set and reset input terminals of a flip-flop 180 in the oxygen uptake computer 7 of FIG. 4 effectively to measure the time interval between the pulses in the two signals. The flip-flop 180 is set upon the receipt of each pulse in the H signal, and it remains set until the receipt of the following pulse in the P signal. The output Q of the flip-flop 180 is shown by the waveform in FIG. 5, and the duration of each pulse of the waveform Q represents a time interval corresponding to the oxygen depletion of the sample.

The output signal Q of the flip-flop 180 is applied to a monostable multivibrator 182 and to an and gate 184. The other input signal to the and gate 184 is derived from a clock signal generator 192, the clock generator providing calibration clock pulses shown by the waveform R of FIG. 5. The repetition frequency of the clock pulses R is established to correspond with the calibration and response rate of the oxygen measuring system 6 of FIG. 1. The and gate 184 produces a burst of pulses when the flip-flop 180 is in its set state, as represented by the signal S in FIG. 5. The number of pulses in the burst is indicative of the oxygen depletion in each air sample. The S signal is fed into an oxygen pressure normalizing and adder circuit 194 in the oxygen uptake computer 7.

Figure 5:
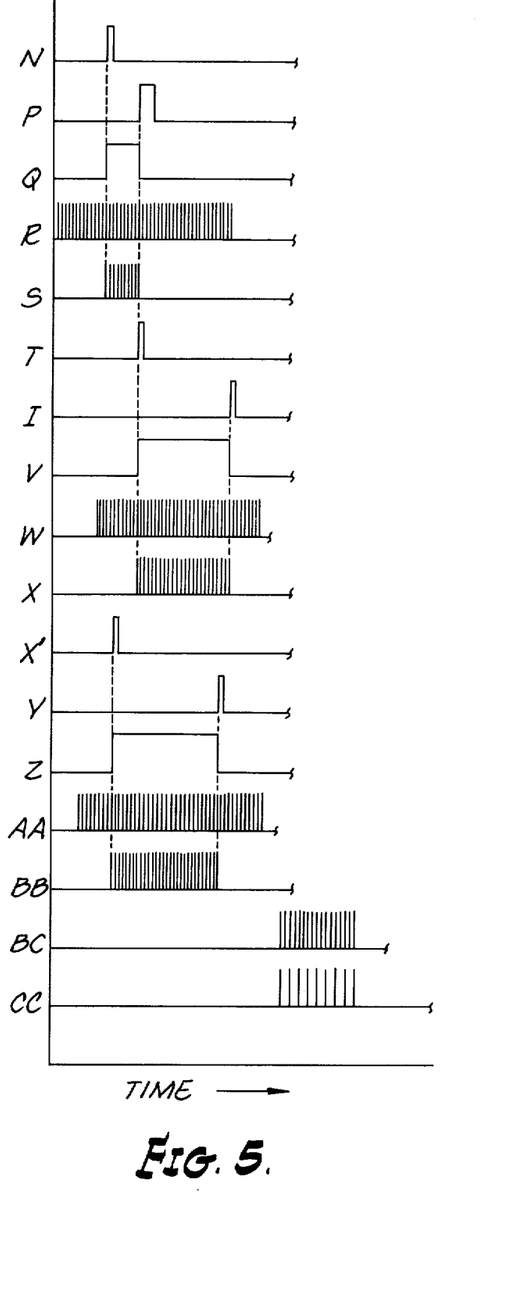
FIG. 5 is a series of waveforms present in various portions of the block diagram of FIG. 4, and useful in explaining the operation of the oxygen uptake computer.

As mentioned above, the Q output signal from the flip-flop 180 is also introduced to a monostable multivibrator 182, and causes the multivibrator to produce an output signal represented by the waveform T in FIG. 5. The T signal is applied to the set input terminal of a flip-flop 186, and each pulse in the T signal sets the flip-flop. The flip-flop 186 remains in its set state unitl it receives a pulse from a presettable down counter 188, the latter pulse being included in the signal I of FIG. 5. As a result, the flip-flop 186 generates an output represented by the waveform V in FIG. 5, and which is applied to an and gate 190.

The C signal from the monostable multivibrator 58 of the volume computer 2 of FIG. 2 is applied to a counter 196 in the oxygen uptake computer 7 of FIG. 4, and the J timing signal from the generator 86 of the volume computer is applied to the presettable down counter 188. In addition, the J timing signal is applied to an ambient pressure normalizing sequencer 213 in the circuit 194 of the oxygen uptake computer 7. The H timing signal from the clock generator in the volume computer is also applied to the sequencer 213.

The counter 196 is a usual binary counter, and it serves to count the successive pulses in the C signal received from the volume computer. On the receipt of the previous pulse in the J signal by the presettable down counter 188, which is interconnected with the counter 196, the data concerning the number of C signal pulses received during the preceding minute is transferred to the counter 188, and this number is reduced in the counter 188 by substracting pulses received by the down counter from the and gate 190. The latter pulses are designated by the waveform X in FIG. 5, and they constitute the clock pulses W received from a clock generator 198, as gated by the and gate 190.

The output from the presettable down counter 188 is the timing signal I which, as previously mentioned, is fed to the carbon dioxide and respiratory quotient computer 19 of FIG. 8. The output of the counter 188 is also used in the oxygen uptake computer, as mentioned above, to reset the flip-flop 186. Each pulse of the I timing signal occurs when the number of pulses in the C signal have been counted down to zero by the X pulses from the and gate 190. The timing of each pulse in the I signal will vary in accordance with the number of C pulses accumulated in each period.

The rate of pulse generation by the clock pulse generator 198 (clock signal W) is set to be fast enough so that the counter 188 can be counted down from its maximum number to zero in approximately 5 seconds, and yet slow enough to permit calculations to take place between the pulses in the oxygen uptake computer. It can thus be seen that the X signal output from the and gate 190 contains the same number of pulses as the C signal derived from the volume computer 2. The X signal, therefore, indicates the volume of expired air, but with the information presented on a reduced time basis and at a later time, as compared with the C signal.

The oxygen uptake computer 7 also includes a flip-flop 200 which is set by the pulses in the X signal from the and gate 190, and which applies its output Z to an and gate 202. A clock signal generator 204 also applies its output (AA) to the and gate. The output (BB) of the and gate is applied to a presettable down counter 214 in the circuit 194, and is also applied to the carbon dioxide and respiratory quotient computer 19 of FIG. 8. The output of the down counter 214 (waveform Y in FIG. 5) serves to reset the flip-flop 200, so that the output of the flip-flop 200 is represented by the waveform Z in FIG. 5.

With the introduction of the X signal, shown in an expanded time frame on the line X' of FIG. 5, to the set input terminal of the flip-flop 200, a positive pulse output is initiated from the flip-flop which remains until the flip-flop is reset by the Y signal from the counter 214. Since the number of pulses in the X signal is indicative of the volume of expired air, the Y signal is indicative of the normalized oxygen partial pressure reduction in the expired air and the normalized ambient pressure during the same period. The duration of each output pulse from the flip-flop 200, as shown by the waveform Z in FIG. 5, is therefore a function of the normalized ambient pressure and partial pressure reduction.

As described, the Z signal is fed to the and gate 202, together with output AA of the clock generator 204, so that the signal BB from the and gate is an effective multiplication of the two values, since each pulse in the X signal is indicative of the passage of a quantity of expired air, and the duration of each Z pulse developed is an indication of the partial pressure reduction.

The oxygen pressure normalizing and adder circuit 194 contains, in addition to the counters 206 and 204, and the ambient pressure normalizing sequencer 213, an inverter 212, a storage register 210 and a binary adder 208. The S signal from the and gate 184 is fed to the counter 206, and the output of the counter is fed to the binary adder 208 and to the inverter 212. The counter 206 is a usual binary counter, and it provides a parallel output of a binary number representing the total number of S signal pulses received.

The binary adder 208 receives a first input from the counter 206, and a second input from the storage register 210. The contents of the storage register 210 are determined during a special pressure normalization cycle initiated, for example, by a switch input SW. This normalization cycle is initiated only when a significant change in ambient pressure may have occurred.

The activation of the switch SW establishes a system configuration such that the undepleted air from the interior of the oven of FIG. 1, which is at a slightly higher pressure than ambient, will fill the oxygen cell 5. When the cell is filled, the system automatically returns to normal. The oxygen cell 5 now contains air at ambient pressure with a 21% oxygen content until a new sample of expired air is introduced from the sampling apparatus 4. The measuring system 6 is now initiated to obtain a measure of the normalized oxygen partial pressure, and that reading is stored in the counter 206. The output of the counter is applied as a data input through the inverter 212 to the storage register 210.

A read signal from the ambient pressure normalizing sequencer 213 is developed in response to the T signal applied thereto from the monostable multivibrator 182, and this read signal causes the output of the inverter 212 to be read into the storage register 210. The storage register 210 is then set to a binary number representative of the normalized ambient pressure, so that the ambient pressure normalization cycle is completed. The output of the storage register 10 is fed to the binary adder 208 in the circuit 194, and it is also fed to the carbon dioxide and respiratory quotient computer 19.

When the outputs from both the counter 206 and the storage register 10 are received by the binary adder 208 in the circuit 194, the adder develops an output binary number which is the sum of the two inputs, and this latter number is applied to the down counter 214 to set the down counter accordingly. The down counter 214, for example, may comprise 14 stages, and it develops the output Y from the thirteenth stage each time the number introduced to the counter from the binary adder 208 is counted down to zero by the subtraction of the pulses in the signal BB which is applied to the counter. The Y signal from the down counter 214 is also fed back to the counter as a load pulse to reload the output of the adder 208 into the counter for the next cycle.

In order to subtract the carbon dioxide production from the calculation for the oxygen depletion so as to obtain a true measure of oxygen depletion, the signal BB representative of the uncorrected oxygen depletion is fed into the carbon dioxide and respiratory computer 19. The computer 19 then subtracts the carbon dioxide production and returns a signal BC representative of the corrected true oxygen depletion to the oxygen uptake computer 7 of FIG. 4, the signal BC having a waveform such as shown in FIG. 5. The signal BC is converted to more usable form in a divider circuit 216 in the oxygen uptake computer. The divider circuit 216, as shown in FIG. 4, comprises four accumulator dividers 218, 219, 220 and 222 in series, together with an accumulator 224. The dividers 218 and 219 have predetermined numbers D3 and D4 as their respective divisors.

As shown, the output of the divider 218, signal CC as shown in FIG. 5, is fed into the oxygen uptake per unit weight computer 9. The succeeding two accumulator-dividers 220 and 222 in the circuit 216 each has the number 10 as its divisor, so that they and the accumulator 224 present the data in hundredths, tenths and units of a measure. The outputs from the divider circuit 216 are stored in a conventional storage unit 226 pending the release through a usual binary-decimal decoder to the digital display 8, which is shown in more detail in FIG. 10. The release of data from the storage unit 226 is initiated upon the receipt of the same I' timing signal which releases the data from the volume computer 2 of FIG. 2 to its display 3. Therefore, the oxygen depletion is displayed each minute simultaneously with the display of the volume of the expired air for the same minute.

For the computation and display of the oxygen uptake per unit of the subject's weight, the oxygen uptake/unit weight computer 9 is included in the system. A complete description of this computer is contained in the copending application Ser. No. 243,369, now U.S. Pat. No. 3,818,901.

In the system of the present invention, and as shown in FIG. 1, the sample of expired air, after it has passed through the oxygen cell 5 is then passed to the carbon dioxide cell 15 to be utilized in the ultimate determination of the carbon dioxide production in the patient's air. The carbon dioxide cell 15, as shown in FIG. 6, comprises a thermal conductivity cell, which is designated 264, a solenoid valve 260, a three-way solenoid valve 262, as well as an air pump 274 and a dryer 276.

The flow of the expired air sample from the oxygen cell 5 to the thermal conductivity cell 264 is controlled by the solenoid valves 260 and 262. The solenoid valve 262 is a three-way valve and, in one position, it permits the flow of the expired air sample into the thermal conductivity cell 264, and in a second position it permits the flow of air from the oven of FIG. 1 to be pumped by the air pump 274 through the dryer 276 and into the thermal conductivity cell 264. The carbon dioxide analyzer 17 of FIG. 1 includes logic and other electronic circuitry which is shown in detail in FIG. 6. The logic circuitry controls the solenoid valves 260 and 262 which, in turn, control the flow of air into the thermal conductivity cell 264. This control provides an automatic zeroing capability for the output of the thermal conductivity cell 264.

Figure 6:
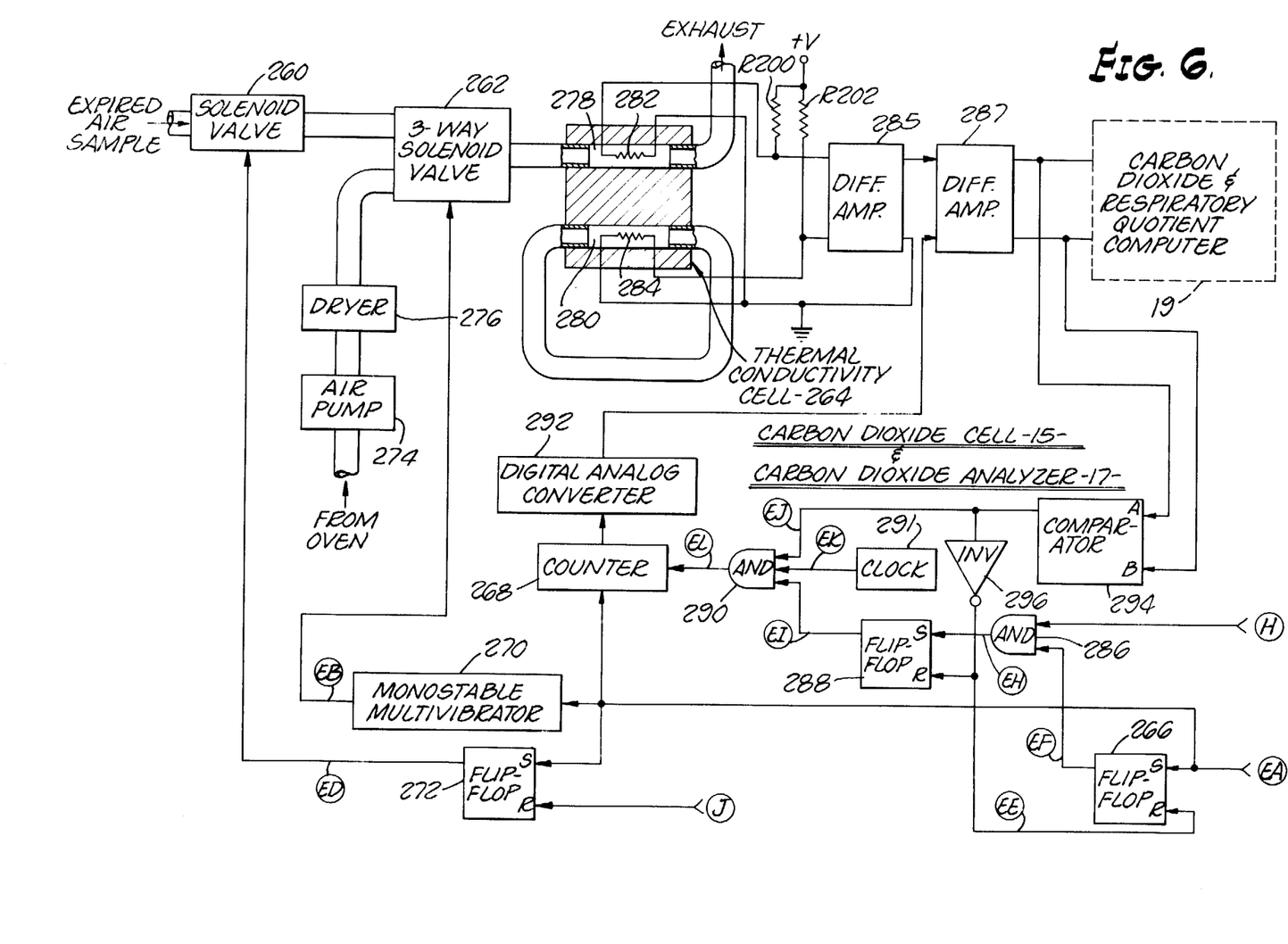
FIG. 6 is a block diagram of a carbon dioxide cell and an associated automatic zeroing circuit which, in accordance with one embodiment of the present invention, are incorporated into the system of FIG. 1.
Figure 7:
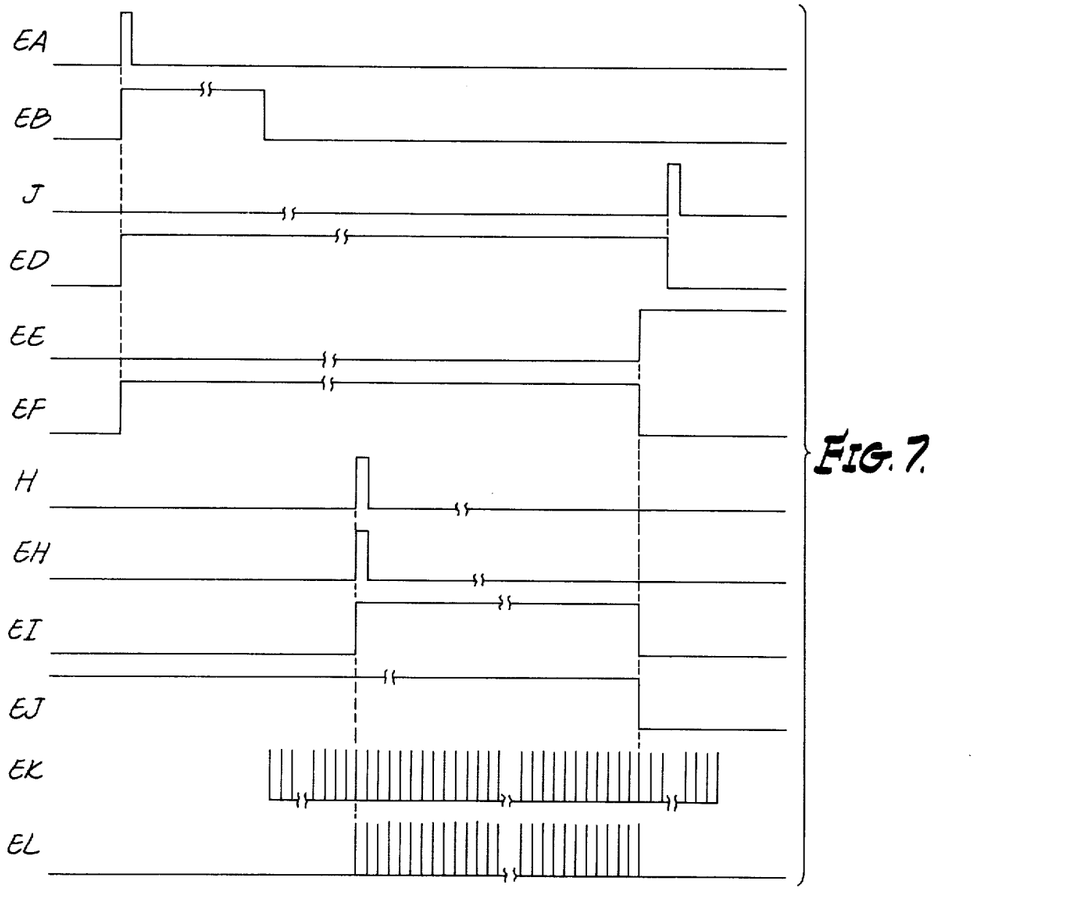
FIG. 7 is a series of waveforms present in the various portions of the block diagram of FIG. 6.

A switch initiated pulse signal EA, as shown by the waveform of FIG. 7, is used to set a flip-flop 266 in the block diagram of FIG. 6, and the EA signal is also applied to a counter 268 and to a monostable multivibrator 270. In addition, the signal EA is used to set a flip-flop 272 in the block diagram. The flip-flop 272 remains set until it is reset by a following pulse in the timing signal J, the pulse being generated at some finite time after the actuation of the switch EA, for example, 60 seconds. The output signal ED of the flip-flop 272 is applied to the solenoid valve 260. The solenoid valve 260 is normally open, and is caused to close during the interval in which the flip-flop 272 is set by the EA signal. Therefore, whenever the flip-flop 272 is set by the EA signal, the flow of air sample from the oxygen cell 5 to the carbon dioxide cell 15 is blocked by the valve 260, and the flow remains blocked until the flip-flop 272 is reset by the following pulse in the J timing signal.

A monostable multivibrator 270 responds to the switch actuated signal EA to develop an output pulse of predetermined duration, as shown by the signal EB of FIG. 7. The EB signal is applied to the three-way solenoid valve 262. In its normal state, the valve 262 permits the air sample from the valve 260 to pass to the thermal conductivity cell 264, and blocks the entry of air from the air pump 274. However, when the multivibrator 270 is triggered by the signal EA, the valve 262 is actuated for a predetermined time interval, as determined by the width of the pulse of the signal EB, to switch the flow to the thermal conductivity cell 264 from the valve 260 to the air pump 274. During that interval, the air pump 274 pumps air from the oven of FIG. 1 through the dryer 276 into the channel 278 of the thermal conductivity cell 264.

Therefore, whenever the switch EA is operated, dry oven air is introduced into the channel 278 of the cell 264 for a predetermined time interval of, for example, 15 seconds. At the end of that interval, the valve 262 returns to its normal position, prohibiting the entry of oven air. However, when the valve 262 first returns to its normal position, the valve 260 remains closed for a subsequent interval, so that the expired air sample from the oxygen cell 5 is likewise prohibited from entry to the cell 264. This subsequent time interval may be a duration, for example, of 45 seconds.

During the subsequent time interval when no air is introduced into the channel 278 of the thermal conductivity cell 264, the sample of dry oven air is held in the channel 278. Static dry air at the same temperature is permanently held in a second channel 280 in the thermal conductivity cell, the latter cell being part of a closed loop which is filled with a dessicant.

A thermistor 282 is positioned in the channel 278, and a thermistor 284 is positioned in the channel 280. The thermistors each have one side connected to ground. The other side of thermistor 282 is connected to the positive terminal of a source of voltage V through a resistor R200, and the other side of the thermistor 284 is connected to the positive terminal of the source V through a resistor R202. The two thermistors are also connected to a differential amplifier 285. One output of the differential amplifier 285 is grounded, and the other output is connected to a second differential amplifier 287.

The heat generated by the individual thermistors 282 and 284, and the ultimate temperature reached by each thermistor is a function of the thermal conductivity of the surrounding gas in the respective channels 278 and 280. Therefore, the ultimate resistance of each of the thermistors is a function of the thermal conductivity of the surrounding gas. Theoretically, with similar gas samples in both the channels 278 and 280 the thermistors 282 and 284 would reach the same temperature and would therefore exhibit the same resistance. Under these conditions, the bridge formed by the thermistors and the resistors R200 and R202 would be balanced, so that zero voltage output would exist.

The voltage output of the bridge circuit is applied to the differential amplifier 285, and the differential amplifier develops an output signal with respect to ground which is proportional to the voltage which appears across the bridge when it becomes unbalanced. During normal operation of the system, during which both the valves 260 and 262 permit the air sample from the oxygen cell to flow through the channel 278, the bridge becomes unbalanced, and the unbalancing of the bridge is a direct measurement of the carbon dioxide content in the air sample flowing through the channel 278, as compared with the dry air in the channel 280.

The resulting electrical output from the differential amplifier 285 forms one input to the differential amplifier 287. The second input to the differential amplifier 287 is derived from the automatic zeroing circuit of the system. The automatic zeroing system responds to the switch signal EA and controls the valves 260 and 262 in the manner described above, so that the normal air sample in the channel 278 is replaced by a dry air control sample, and the electric circuitry is then adjusted to a zero output for that sample. This assures that the system will be properly calibrated, and that appropriate compensation will be made for temperature drift and other drift in the bridge circuit.

In operation, the automatic zeroing circuit, as shown in FIG. 6, receives the EA switch signal as the setting input to the flip-flop 266, and it receives an EE signal, having the waveform shown in FIG. 7 was the resetting input to the flip-flop. Therefore, the flip-flop 266 is set upon the receipt of the switch signal EA, and it remains set until it receives a pulse in the resetting signal EE. The output signal of the flip-flop 266 designated EF is applied as one input to an and gate 286. The other input to the and gate 286 is the H clock signal which has a pulse component initiated at some finite time, for example, 50 seconds, after the initiation of the switch signal EA.

The output of the and gate 286 is an EH signal, having the waveform shown in FIG. 7, which is directly applied as the set signal to a flip-flop 288. Since each pulse in the H signal is periodically generated during the operation of the gas analyzer, the gating circuit of the and gate 286 is included in the system to cause the automatic zeroing circuit to be activated only when the switch producing the EA signal is operated, and by the receipt of the pulse in the H signal immediately following the actuation of that switch. The EE signal which resets the flip-flop 266 is also used to reset the flip-flop 288.

The flip-flop 288 generates an output signal EI which is applied as one input to an and gate 290. The other inputs to the and gate 290 are a clock signal EK derived from a clock signal generator 291 and which has the waveform shown in FIG. 7, and an EJ signal derived from a comparator 294. The EJ signal is passed through an inverter 296 to produce the resetting EE signal. When both the EI signal and the EJ signal are high, which occurs some time after the initiation of the switch signal EA, the gate 290 passes the pulses in the EK clock signal to the counter 268, to produce a signal EL having the waveform shown in FIG. 7.

The counter 268 was previously set to zero by the switch signal EA, so that the pulses in the signal EL cause the counter 268 to start counting up from zero. The resulting digital output of the counter 268 is applied to a digital/analog converter 292, the output of which forms the second input for the differential amplifier 287. The initial analog voltage output of the digital/analog converter 292 is set to a preselected negative voltage, and this negative voltage increases towards zero as the digital inputs from the counter 268 are converted to an incrementally increasing analog voltage output proportional to the digital number from the counter.

The outputs from the differential amplifier 287 are fed to the carbon dioxide and respiratory quotient computer 19 of FIG. 8, and the outputs also supplied to the comparator 294. The comparator 294 may be any conventional network connected such that its output EJ is high when its A input is negative, and its B input is positive, and whose output EJ is low when its A input is positive and its B input is negative. The output EJ from the comparator 294 has the waveform shown in FIG. 7, and it is applied to the inverter 296 and to the and gate 290, as stated above. The inverter output resulting from the EJ input signal, as stated above, is the EE signal shown in FIG. 7, and which is applied as the resetting signal for the flip-flops 288 and 266.

With the initial output voltage of the digital/analog converter 292 arbitrarily set at a value more negative than the amplified differential voltage from the bridge circuit associated with the thermal conductivity cell 264, it is apparent that during the time period between the initiation of the EA switch signal and the receipt of the following pulse in the H signal, dry oven air is introduced and held in the channel 278 of the thermal conductivity cell 264. During that interval, the output of the amplifier 285 is more positive than the voltage output of the converter 292, thus assuring a high in the EJ signal applied to the and gate 290. Then, upon the occurrence of the next pulse in the H signal, the and gate 290 is enabled, so that a series of pulses EK are passed through the and gate as the signal EL to actuate the counter 268. This causes the counter to count up, so that an increasing digital number appears at its output.

Upon the receipt of an increasing digital number from the counter 268 caused by each pulse in the series of pulses in the EL signal, the initially negative output signal of the digital/analog converter 292 is made more positive by small preselected increments. In this way, the output voltage from the digital/analog converter 292, which is applied as one input to the differential amplifier 287, ultimately exceeds the output voltage of the amplifier 285 which is applied as the other input to the digital amplifier 287. With the first incremental increase in the voltage from the digital/analog converter 292 above the level of the output voltage from the amplifier 285, the outputs of the differential amplifier 287 reverse polarity. This causes the output of the comparator 294 to change, so that the EE signal goes high and resets the flip-flops 288 and 266.

The above action locks in the existing analog voltage output from the converter 292 thereby effectively providing, for all practical purposes, a zero output from the amplifier 287 for dry air in both channels 278 and 280 of the cell 264, in spite of bridge unbalances and amplifier drifts. The system then automatically switches over to normal operation, during which the air sample from the oxygen cell 5 is fed into the channel 278, and any bridge unbalances which occur due to the carbon dioxide content of the air samples are accurately referenced to the calibrated zero point. Normal operation of the system continues until the switch signal EA is again actuated to initiate another calibration zeroing cycle.

As stated above, the outputs from the differential amplifier 287 are applied to the carbon dioxide and respiratory quotient computer 19 which is shown in block form in FIG. 8. Specifically, the outputs of the differential amplifier 287 are fed to an analog/digital converter 298 in the computer. The C signal from the volume computer 2 of FIG. 2 is also applied to the computer 19 as the set signal for a flip-flop 300 of a clock gating circuit 302. Each pulse of the C signal is representative of the exhalation by the patient of a known volume of air, as described above. The computer 19 effectively multiplies the digital output of the converter 298 with the C signal from the volume computer to obtain the carbon dioxide production measurement.

Figure 9A:
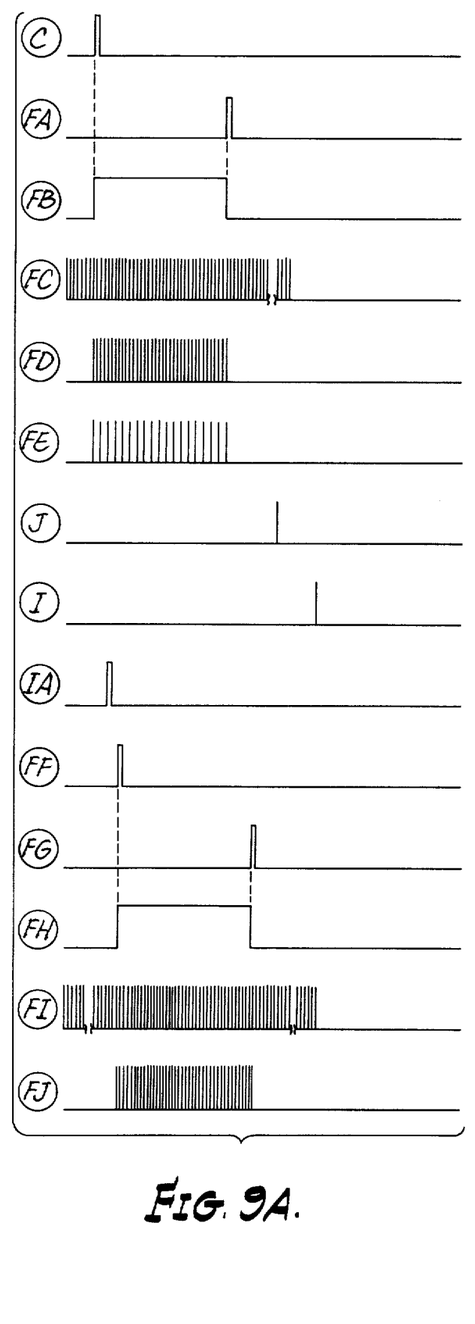
FIGS. 9A and 9B each represents a series of waveforms present in various portions of the block diagram of FIG. 8, and useful in explaining the operation of the carbon dioxide and respiratory quotient computer.
Figure 9B:
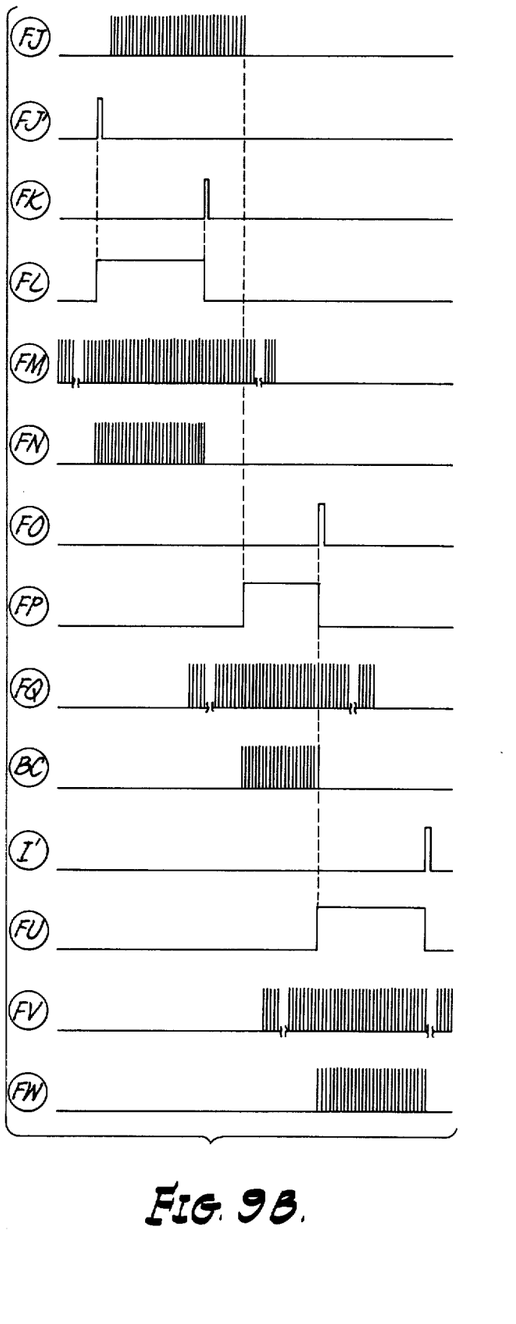

As shown in FIG. 8, the clock gating circuit 302 comprises a flip-flop 300, an and gate 304, and a clock signal generator 306. The reset input to the flip-flop 300 is the FA signal, with a waveform such as shown in FIG. 9, and which is derived from a decoder 310. The output from the flip-flop 300 is the FB signal, having the waveform shown in FIG. 9, and this signal is introduced as one input to the and gate 304. The other input to the and gate 304 is the FC clock signal output of the clock signal generator 306. The output of the and gate 304 is the FD signal having a waveform such as shown in FIG. 9. This signal is passed through a frequency divider 312, and the resulting FE signal is applied to an accumulator 314. The accumulator 314 applies its output to a down counter 316.

The output of the storage register 210 of the pressure normalizing circuit in the oxygen uptake computer 7 of FIG. 4 is applied to the carbon dioxide production computer 19 to correct its measurements to ambient pressure conditions. This output is applied to an up counter 308 in the carbon dioxide computer 19 of FIG. 8, and the FD signal is also applied to the up counter. The output of the up counter 308 is applied to the decoder 310 which, in turn, develops the reset signal FA. The output from the storage register 210 of FIG. 4, which is applied to the up counter 308 is a binary number representative of the normalized pressure, and that number is used to set the counter 308. The counter is then counted up by the pulses of the FD signal derived from the and gate 302.

The output of the counter, as mentioned, is applied to the decoder 310, which can be any conventional decoder which develops an output pulse when a predetermined digital number is applied to its input. The decoder develops a pulse in the FA signal, after the counter 308 has been counted up to a particular number by the pulses in the FD signal. When that number is reached, the flip-flop 300 is reset, thereby terminating the series of pulses in the FD signal.

The series of pulses in the FD signal are thereby representative of the volume of expired air multiplied by a term equal to the predetermined number in the decoder 310 less the normalized ambient pressure, as represented by the number derived from the storage register 210 of the oxygen uptake computer 7 of FIG. 4. As mentioned above, the FD signal is fed to the frequency divider 312, in which it is divided by a predetermined number for scaling purposes. The resulting FE signal output from the divider is fed to the accumulator 314, and the number thus accumulated during the prescribed time is periodically read into the presettable down counter 316 by the introduction of the J signal from the volume computer 2 of FIG. 2.

As previously stated, the analog voltage outputs from the amplifier 287 of FIG. 6 are applied to the analog/digital converter 298, and these outputs are representative of the percentage of carbon dioxide in an expired air sample. Also introduced to the analog/digital converter is the I signal from the oxygen uptake computer 7 of FIG. 4, and which contains a pulse generated at the conclusion of calculations in the oxygen uptake computer. The pulse in the I signal is used to begin the conversion process in the analog/ditital converter 298, and a pulse in the FF signal output from the converter is developed at the conclusion of the conversion. The FF signal is applied both to an "or" gate 318 and as a setting input to a flip-flop 320 in a clock gating circuit 322.

The clock gating circuit 322 comprises a flip-flop 320, a clock signal generator 324 and an and gate 326, and this latter clock gating circuit is comparable with the clock gating circuit 302. The flip-flop 320 supplies its output FH to an and gate 326, and when the flip-flop is set by a pulse in the FF signal, the and gate is enabled. When the and gate is enabled, it passes clock pulses from the clock signal generator 324, as represented by the signal FJ, to the down counter 316.

The signal FJ also serves to set a flip-flop 328 in a clock gating circuit 330. The pulses in the FJ signal continue until the flip-flop 320 is reset by an FG signal derived from the down counter 316. The FJ signal is fed to the counter 316 to count down the number introduced from the accumulator 314, and a pulse is generated in the FG signal output of the counter when that number has been counted down to zero. As stated above, this pulse resets the flip-flop 320 and terminates the pulses in the FJ signal.

The pulse in the FG signal from the counter 316 which resets the flip-flop 320, is also applied to a flip-flop 321 in a clock gating circuit 323 to set the latter flip-flop. When the flip-flop 321 is set, its output FP enables an and gate 360, so that the and gate passes pulses FQ from a clock signal generator 362. The pulses passed by the and gate 360 are fed through an or gate 338 to the down input of an up-down accumulator counter 364. The pulses from the and gate 360 are also applied as signal BC to the oxygen uptake converter 7 of FIG. 4.

As mentioned above, the FJ signal from the and gate 326 is also used to set the flip-flop 328 in the clock gating circuit 330. When the flip-flop 328 is set, its output FL enables the and gate 336, and the and gate passes the clock signal pulses FM from a clock signal generator 334 to the or ate 338, and also to the input of a down counter 332. The analog/digital converter 298 has its output connected to the counter 332, and sets the counter to a particular setting corresponding to the binary number developed at the output of the converter. The counter 332 is then counted down to zero by the FN signal from the and gate 336, and when it reaches zero, a pulse appears in the FK signal which resets the flip-flop 328.

The FK signal is also applied to the or gate 318, as is the FF signal. When a pulse occurs in either the FF or the FK signal, the output from the converter 298 is read into the counter 332 to set the counter at a setting corresponding to the binary number represented by that output. The FN signal output of the and gate 336 is representative of the previous established valve of the volume of expired air multiplied by the percentage of carbon dioxide in the expired air, that is, the volume of carbon dioxide in the expired air.

The FN signal is supplied as an input to the or gate 338, as well as an input to the divider 340. The divider 340 is included in the circuit for scaling purposes. The output of the divider 340 is applied to a storage counter 342, and also to a divider circuit 344 in order to convert the information to more usable form. The divider circuit 344 is made up of four accumultor dividers 346, 348, 350 and 352 in cascade, together with an accumulator 354. The dividers 346 and 348 have predetermined numbers as divisor, and the accumulator-dividers 350 and 352 each have the number ten as a divisor, so that they, and the accumulator 354 may present data to the storage 356 in units, tenths and hundredths of a measure.

The outputs from the divider circuit 344 are stored in the storage unit 356 pending release through a usual binary-decimal decoder 358 to the display device 21 which is shown in FIG. 10. The release of data from the storage unit 356 is initiated upon the receipt of the same I' signal which releases the results of the volume computer 2 and the oxygen uptake computer 7 to their respective displays 3 and 8. Therefore, the carbon dioxide production is displayed each minute simultaneously with the displays of the oxygen volume and oxygen uptake in the expired air for the same minute.

As previously stated, the FG signal is applied to set the flip-flop 321 in the clock gating circuit 323. The flip-flop 321 is reset by the FO signal derived from the up-down counter 364, and the FO signal is also used to set a flip-flop 366 in a clock gating circuit 368. The output of the or gate 338, that is the FN signal or the BC signal, is applied to the accumulator counter 364 to count down the counter, while the BB signal from the oxygen uptake computer of FIG. 7, representative of a measurement of oxygen uptake in the expired air sample, is introduced to the accumulator counter 364 to count up the counter. The counter 364 develops a pulse in its output signal FO whenever the counter has been counted to zero. As stated above, the pulse in the FO signal resets the flip-flop 321, thereby effectively terminating the passage of pulses in the FQ signal through the and gate 360. As also stated, the pulse in the FO signal is also used to set the flip-flop 366 in the clock gating circuit 368.

With the series of pulses in the FN signal being representative of the carbon dioxide production in the expired air sample, and the series of pulses in the BB signal occurring in time prior to the initiation of the burst of pulses in the BC signal from the and gate 360, it will be understood that the carbon dioxide production is effectively subtracted from the measure of oxygen depletion, and the BC signal therefore contains a number of pulses corresponding to the difference, which is the true or corrected oxygen depletion. Due to the requirement for additional computations on the oxygen depletion data contained in the BC signal furnished to the oxygen uptake computer 7 before the ratio of carbon dioxide production of oxygen depletion, or the respiratory quotient, can be established, the FN signal (representative of the volume of carbon dioxide production) is stored in the storage counter 342. A pulse in the FO signal, which occurs at the conclusion of the BC signal, is used to set the output of flip-flop 366, thus initiating the action required for the ultimate release of the data in the storage counter 342.

When the flip-flop 366 is set, its FU output enables the and gate 372 in the clock gating circuit 368, so that pulses FV from a clock signal generator 370 are passed as pulses in the FW signal to the storage counter 342 and to a frequency divider 374. These pulses which are fed into the storage counter 342 count down the carbon dioxide production data stored therein. When the stored data has been counted down to zero, a pulse is generated in the I' signal output from the counter, and this pulse is utilized to reset the flip-flop 366, thereby assuring that the number of pulses in the FW signal from the gate 372 is equal to the number stored in the counter 342. As stated above, the FW signal is also applied to the frequency divider 374, a second input to the divider being the signal from the storage unit 226 in the computer 7, which is representative of the volume of oxygen uptake in the particular sample of expired air being processed. The output from the divider 374 represents the respiratory quotient, that is, the volume of carbon dioxide production divided by the volume of oxygen depletion.

The output signal from the divider 374 is fed to a first of two dividers 376 and 378, each having a number 10 as a divisor, and which are connected in series with an accumuator 380, so that the data presented to a storage unit 382 may be presented in units, tenths and hundredths of a measure. The outputs from the dividers and accumulator are stored in the storage unit 382 pending release through a usual binary-decimal decoder 358 to the digital display 23 of FIG. 10. The I' signal is applied to the storage unit 382, and to similar storage units in the other computers, so that the release of data from the storage units to the display will be simultaneous. Therefore, the respiratory quotient is displayed by the display 23 at the same time the oxygen volume is displayed by the display 3, at the same time the oxygen depletion is displayed by the display 8, and at the same time the carbon dioxide production is displayed by the display 21.

The carbon dioxide cell 15, as shown in FIG. 11 connprises an infrared cell which replaces the thermal conductivity cell 264 of FIG. 6. Certain of the electronic and other components of the system of FIG. 11 are the same as those of FIG. 6, and have been designated by the same numbers.

In the system of FIG. 11, an infrared analyzer for continuous monitoring is used, and this analyzer may be of any appropiate commercially avaible type. The analyzer includes a sample cell 402 through which the expired air sample from solenoid valve 262 is passed to the exhaust. A light source 404 is provided which may be a minature michrome wire-wound source which operates at low temperature (820° C) and which has proven to be economical, rugged and long lived. Energy for the source may be derived from a constant power regulated direct current supply. Radiation from the source is focused on the sample cell 402 by an appropriate concave mirror 406.

A chopper mechanism 408 is interposed between the source 404 and mirror 406. The chopper mechanism serves to interrupt the infrared beam from the source 404. The chopper includes optical filters which pass two wavelengths from the IR source. One wave-length is chosen in a region where the sample absorbs strongly and the other in a region where the sample is transparent. A detector 410 is provided at the other end of the sample cell. The detector may be a lithium tantalate pyroelectric detector. The particular detector operates at the oven temperature, requires no vacuum, and is fast, rugged and economical. The output of the detector is passed through a pre-amplifier 420 to a logarithmic conversion cicuit 422. The output of the circuit 422 is passed through a switch SW1 selectively to a first sample and hold circuit 424 and to a second sample and hold circuit 426. The sample and hold circuit 424 receives the output from the circuit 422 at the first wave length, and the sample and hold circuit 426 receives the output at the second wavelength. The sample and hold circuits are connected to a differential amplifier 428 which, in turn, is connected to an absorbence-to-percent concentration linearizer 430. The linearizer 430 is connected to the differential amplifier 287.

The operation of the cell 402, and its associated components is known to the art.

The measurements of sample transmittance involves the measurement of both the intensity reaching the detector 410 at the first wavelength, and at the second wavelength. The transmittance T, is the ratio of the two intensities:

$$T = \frac{I}{I_o}$$

The quantity which is most simply related to concentration is the absorbance A, where:

$$A = -\log T$$

The output of the converter circuit 422 corresponds to the absorbance. The difference between the two outputs is the absorbance of the sample since:

$$A = -\log T = \log I_o - \log I$$

Therefore, the output of the differential amplifier 428 is the absorbance of the sample, and this value is transformed into percent concentration of the linearizer 430.

The remaining components of the system of FIG. 11 are identical to those of FIG. 6.

The invention provides, therefore, an improved respiratory gas analyzer-computer, which automatically measures and instantaneously displays the volume of expired air from a subject, the oxygen depletion of the expired air, and the oxygen depletion per unit weight of the patient during a given period of time, and which automatically measures and instantaneously displays the carbon dioxide production and respiratory quotient in the expired air during the same given period of time.

The system of the invention displays the aforesaid parameters instantaneously, and without the need for arduous manual calculations. Moreover, the system and apparatus of the invention is rapid and precise in its operation, and is easy to operate and requires no particular technical skills.

While particular embodiments of the invention have been shown and described, modifications may be made, and it is intended in the following claims to cover all modifications which come within the spirit and scope of the invention.

What is claimed is:

1. Apparatus for automatically periodically measuring the volume of air expired by a subject during each of a succession of given time intervals, and for measuring and computing the carbon dioxide production in the expired air for each of the time intervals, said apparatus including: metering means for receiving the expired air from the subject and for generating electrical output pulses having a repetition frequency representative of the volume of air expired by the subject during successive time intervals and under standard temperature conditions; volume computer means including multiplier circuit means coupled to said metering means for multiplying each pulse of the electrical output pulses therefrom by a predetermined number, and further including divider circuit means coupled to said multiplier circuit means for subsequently dividing the pulses from said multiplier circuit means by a predetermined number, so as to compute the volume of air expired by the subject during each of time intervals corrected to body temperature conditions and to produce electrical output pulses representative of the corrected volume; sampling means coupled to said metering means for extracting a sample of the expired air therefrom having a proportionate relationship to the total volume of air expired by the subject during each of the given time intervals; carbon dioxide measuring means coupled to said sampling means for measuring the concentration of carbon dioxide in each sample of the expired air and for producing output electrical pulses having a repetition frequency representative of the concentration of carbon dioxide in each such sample; and carbon dioxide computer means coupled to said carbon dioxide measuring means and to said volume computer means and including multiplying circuit means for multiplying the output pulses from the carbon dioxide measuring means with the output pulses from the volume computer means to produce electrical output pulses representative of the carbon dioxide production in the expired air of the subject for each given time interval.

2. The apparatus defined in claim 1, and which includes oxygen measuring means coupled to said sampling means for measuring the concentration of oxygen in each sample of the expired air and for producing output electrical pulses having a repetition frequency representative of the concentration of oxygen in each such sample; and oxygen uptake computer means coupled to the oxygen measuring means and to the volume computer means and including multiplying circuit means for multiplying the output pulses from the oxygen measuring means with the output pulses from the volume computer means for producing electrical output pulses representing the oxygen uptake in the expired air of the subject for each given time interval.

3. The apparatus defined in claim 2, in which the carbon dioxide computer means includes circuit means coupled to the oxygen uptake computer means for comparing the output pulses from said carbon dioxide measuring means with the output pulses from the oxygen measuring means to determine the ratio between carbon dioxide production and oxygen depletion in the expired air of the subject for each of the given time intervals.

4. The apparatus defined in claim 3, and which includes separate display means connected to said volume computer means, to said oxygen uptake computer means and to said carbon dioxide computer means; and circuit means included in said carbon dioxide computer means for generating a timing signal and for applying said timing signal to said volume computer means and to said oxygen uptake computer means for simultaneously controlling the output information from all of the computer means to said display means.

5. The apparatus defined in claim 2, in which said carbon dioxide computer means is coupled to said oxygen uptake computer means for deriving a signal representative of ambient pressure therefrom; and circuit means included in said carbon dioxide computer means for utilizing said ambient pressure signal to correct the carbon dioxide production calculations in said carbon dioxide computer means to ambient pressure conditions.

6. The apparatus defined in claim 2, in which said oxygen uptake computer means is coupled to said carbon dioxide computer means to permit said carbon dioxide computer means to modify the oxygen uptake in the expired air computation by the oxygen uptake computer means so as to compensate for the carbon dioxide production in the expired air and thereby to provide a true oxygen depletion computation for the expired air.

7. The apparatus defined in claim 1, in which said carbon dioxide measuring means includes a thermal conductivity cell having a first channel through which the expired air sample flows, and a second channel in which dry reference air is circulated, and which includes electrical bridge circuit means including sensing means in said first and second channels for comparing the thermal conductivity of the air in said first and second channels, and output circuit means connected to said bridge circuit means for producing an electrical analog output signal indicative of the thermal conductivity of the sample in said first channel as compared with the reference air in said second channel.

8. The apparatus defined in claim 7, and which includes control circuit means including solenoid valves interposed between the sampling means and the first channel of the thermal conductivity cell for replacing the sample in said first channel with dry reference air, and which further includes automatic zeroing circuit means connected to said bridge circuit means and responsive to a setting signal for balancing said bridge circuit means to reduce the output of said output circuit means to zero when the dry reference air is in the first channel.

9. The apparatus defined in claim 8, in which said zeroing circuit means includes network means for developing, storing and applying a reference balancing value to said bridge circuit means to maintain a zero reference value in said output circuit means for subsequent thermal conductivity measurements until a reset signal is received to recycle said dry reference air.

10. The apparatus defined in claim 1, in which said carbon dioxide measuring means includes an infrared cell having a channel through which the expired air sample flows, and which includes circuit means coupled to the cell for producing an electrical analog output signal indicative of the percent concentration of the sample in the cell.

11. The apparatus defined in claim 10, and which includes control circuit means including solenoid valves interposed between the sampling means and the channel of the infrared cell for replacing the sample in the channel with dry reference air, and which further includes automatic zeroing circuit means for reducing the analog output signal to zero when the dry reference air is in the cell.

12. Carbon dioxide measuring apparatus for measuring the concentration of carbon dioxide in a sample of expired air, said apparatus including: a thermal conductivity cell having a first channel and a second channel; first and second electrical sensing means respectively mounted in the first and second channels; electric bridge circuit means connected to said sensing means for producing an electrical analog output when the thermal conductivity of a gas in the first channel is different from the thermal conductivity of a gas in the second channel; output circuit means connected to said bridge circuit means; means for introducing the expired air sample to the first channel of said cell; means for circulating dry reference air in the second channel of said cell; a source of dry reference air; electrically operated solenoid valve means interposed between said introducing means and said first channel of said cell for selectively replacing the expired air sample in the first channel of said cell with dry reference air from said source; and zeroing control circuit means connected to said solenoid valve means and to said bridge circuit means for controlling said solenoid valve means for the selective replacement of the expired air sample in the first channel with the dry reference air, and for balancing said bridge circuit means for zero output when the dry reference air is in the first channel.

13. The apparatus defined in claim 12, in which said zeroing circuit means includes network means for developing, storing and applying a reference balancing value to said bridge circuit means to maintain a zero reference value in said output circuit means for subsequent thermal conductivity measurements until a reset signal is received to recycle said dry reference air.

* * * * *